July 29, 1952 — W. E. PETERSEN — 2,604,722
MOUSE AND RAT TRAP
Filed Feb. 6, 1948 — 2 SHEETS—SHEET 1
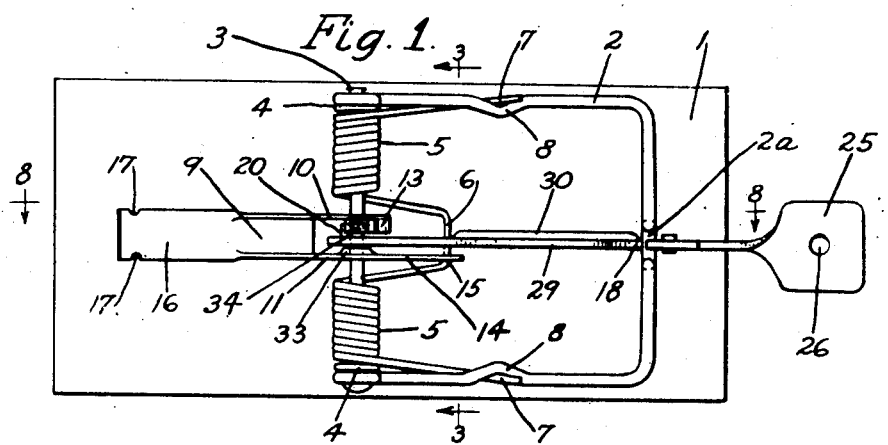
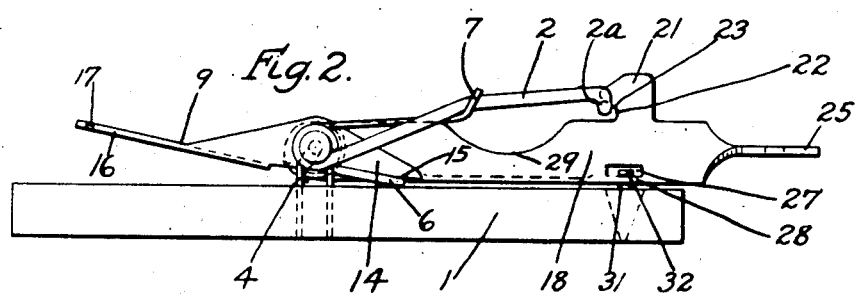
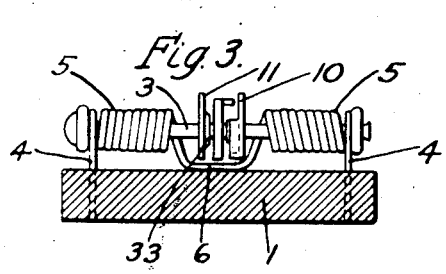
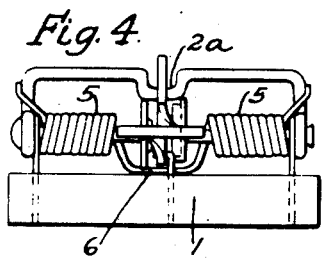
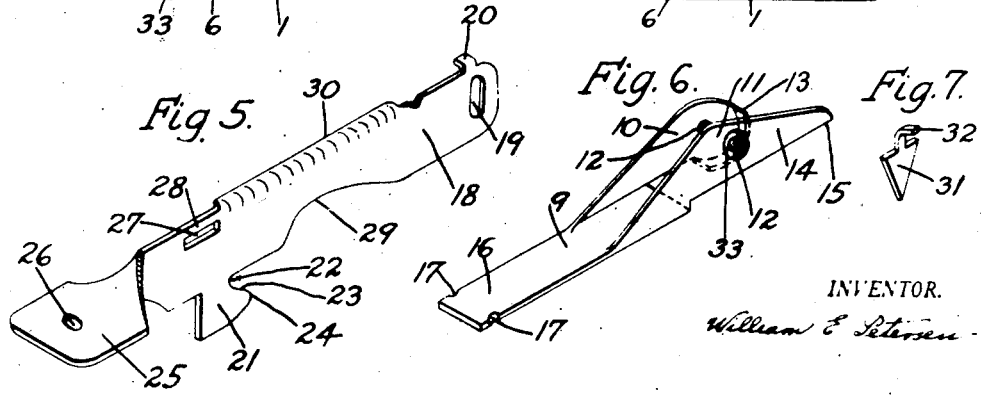
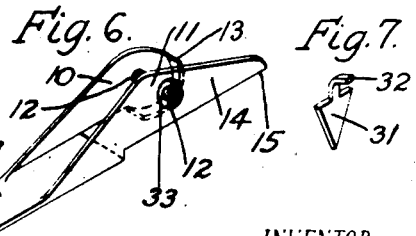
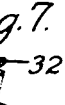
INVENTOR.
William E. Petersen July 29, 1952 W. E. PETERSEN 2,604,722
MOUSE AND RAT TRAP
Filed Feb. 6, 1948 2 SHEETS—SHEET 2
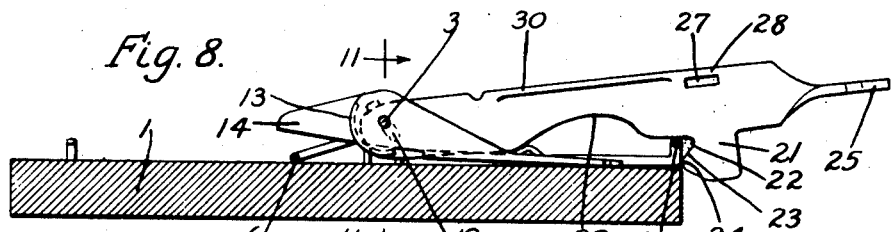
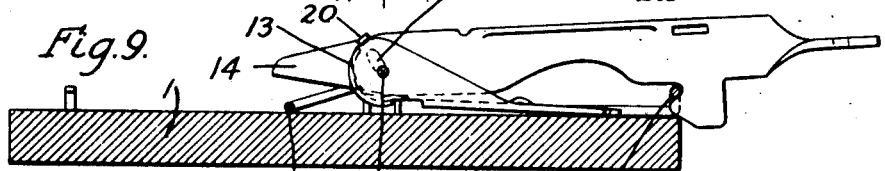
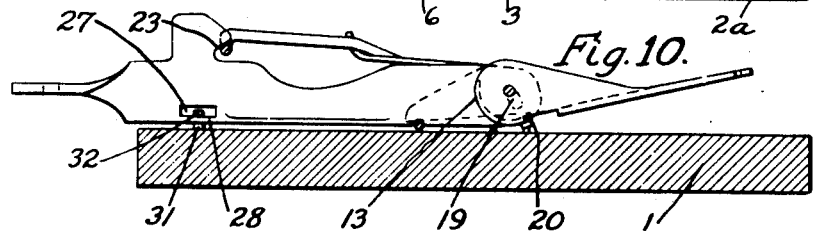 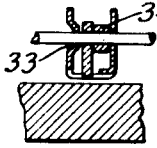
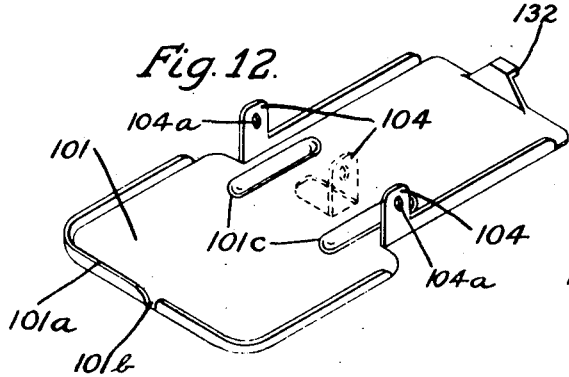 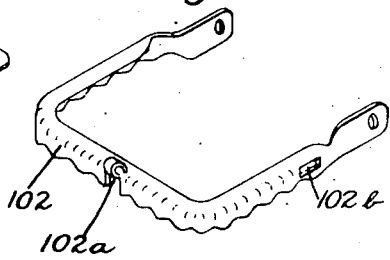
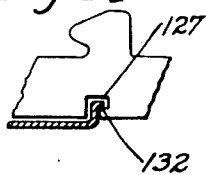
INVENTOR.
William E. Petersen

Patented July 29, 1952

2,604,722

UNITED STATES PATENT OFFICE 2,604,722

MOUSE AND RAT TRAP

William E. Petersen, Cottonwood, Calif.

Application February 6, 1948, Serial No. 6,613

6 Claims. (Cl. 43—83.5)

My invention relates to improvements in animal traps of the spring actuated jaw type, commonly known as rat or mouse traps.

One object of my invention is to provide a trap which may be set without touching the spring actuating jaw with the hands, thereby eliminating touching dead matter left from animals previously trapped.

Another object of my invention is to provide a self setting trap; that is, a trap where the trigger will automatically be set when the jaw is moved to set position.

Another object of my invention is to eliminate the chances of getting the fingers caught in the trap while setting it.

Other objects and advantages of my invention will be apparent from the following description, which, taken in connection with the accompanying drawings, discloses a preferred embodiment thereof.

Referring to the drawings,

Fig. 1 is a plan view of the trap in set position.

Fig. 2 is a side elevation of Fig. 1.

Fig. 3 is a cross-sectional view of Fig. 1 taken on the line 3—3, but showing the trap in sprung position.

Fig. 4 is a rear elevation view of Fig. 1.

Fig. 5 is a detail perspective view of the jaw lifting bar.

Fig. 6 is a detail perspective view of the bait treadle, showing its component parts.

Fig. 7 is a detail perspective view of one embodiment of a staple, which preferably provides the pivotal support for the jaw lifting bar as described later.

Fig. 8 is a side elevation view of the trap, taken on the line 8—8 of Fig. 1, but with the jaw lifting bar in forward position.

Fig. 9 is the same view as Fig. 8, but with the jaw lifting bar in engaged position.

Fig. 10 is the same view as Fig. 9, but showing the trap in set position.

Fig. 11 is a fragmentary sectional view, taken on the line 11—11 of Fig. 8, showing the position of the lifting bar and treadle parts on the pin.

Fig. 12 is a perspective view of a modified form of base.

Fig. 13 is a perspective view of a modified form of jaw member for the base as shown in Fig. 12.

Fig. 14 is a detail fragmentary view of the lifting bar engaged to its pivotal support on the base as shown in Fig. 12.

Referring to the drawings, the trap includes the base 1, which is usually constructed of wood, but may be of metal or other suitable material, and a jaw or striker 2 constructed of relatively stiff wire having a raised portion 2a near its middle portion as shown in Fig. 1 and Fig. 4. The jaw 2 pivots at one end thereof on a pin 3 riveted at its outer ends to prevent axial movements and secured in place by staples 4, 4, which are fastened in the base 1. The jaw or striker 2 is actuated by a pair of spring coils 5, 5, supported on pin 3 and having an integral center base support 6. The outer ends of said spring coils are extended as at 7, 7, for engagement of the loops 8, 8, of jaw 2 in such a way that tension stored in the coils tends to press the jaw up and forward from the position shown in Fig. 2 and Fig. 10 to the position shown in Fig. 8.

The treadle or tripping member 9 is composed of two upwardly extending members 10 and 11 having aligned apertures 12, 12, through which it is pivoted on pin 3 near the center thereof but adjacent one end between the spring coils 5, 5.

The member 10 has an inwardly extended arcuated flange 13 formed in the shape of a semicircle around aperture 12 and pin 3 as shown in Fig. 1, Fig. 6 and Fig. 8. The member 11 has a rearwardly extending portion 14 acting as a stop to limit the upward pivotal movement of the forward end of the treadle 9 when the lower rear edge 15 strikes against spring coil base support 6.

The forward end of the treadle 9 has a bait holding portion 16 provided with notches 17, 17, for the purpose of tying bait to the lever or treadle to keep it from being pulled off when the bait is interfered with. The bait holding end is the longer and relatively heavier end of the treadle and its weight will therefore normally tend to keep this end resting on the base 1.

A lifting bar 18 has a pivotal aperture or slot 19 in one end, which is fulcrumed on pin 3 and large enough so it can slide freely on pin 3 from one extremity to the other. It is so positioned that when it slides from one extremity to the other on pin 3 the bar will be moved forward or rearward.

On the same end of the bar 18 and just above slot 19 the bar is provided with a laterally bent trigger engaging arm 20 positioned to engage and slide freely on the outer side of flange 13 when the pin 3 is in the lower extremity of the slot 19 as shown in Fig. 9 and Fig. 10.

The other end of the bar 18 has a downwardly protruding projection 21 with a notch 22, the lower side of which constitutes an inclined cam or tongue 23. This projection is so located when the bar is in its forward position that pin 3 will be at the upper extremity of the slot 19 and the point 24 of the protruding projection 21 will just clear the raised portion 2a of the striker 2 as shown in Fig. 8.

When the bar 18 is pushed rearwardly to its other extremity, with inclined cam 23 under the raised portion 2a of the striker, the other end of the bar which is fulcrumed on pin 3 will be raised, so that pin 3 will be at the lower extremity of slot 19 and engaging arm 20 will be positioned to slide on flange 13 as shown in Fig. 9.

The outer extreme end of lifting bar 18 is formed into a handle 25 for the purpose of taking hold and lifting this end, and with it, striker 2 from normal or sprung position to set position.

For the purpose of tying the trap, an aperture 26 near the center of the handle 25 is suitable.

Opposite projection 21, the lifting bar 18 is provided with a slot 27 substantially parallel with the edge of the bar, leaving a narrow strip of metal 28.

In order to clear the bait, when in forward position, the bar 18 may be provided with a recess 29. For added strength a rib 30 may also be provided.

A staple 31, Fig. 7, is driven in the base 1 toward its rear end and in such a position that the projection 32 of the staple will act as a pivotal support for the bar 18 at bridge 28, when the trap is in set position, as clearly shown in Fig. 2 and Fig. 10. This staple should be positioned so that the pivotal support 32 will be just a little to the rear of the point of contact between cam 23 and the striker at 2a. The angle of cam 23 should be great enough so that tension of the spring on the striker will be strong enough to release the trap, when it is sprung.

The members 10 and 11 of the treadle should be so spaced that the lifting bar 18 will fulcrum freely between them. Material around the pin aperture 12 on member 11 may be projected inwardly as shown at 33 in Fig. 1, Fig. 3 and Fig. 11 so as to eliminate friction between member 11 and the lifting bar. If necessary, a bushing or spacer 34 may be provided between the lifting bar and member 10 for the purpose of further eliminating friction, as shown in Fig. 1 and Fig. 11.

To set the trap the handle 25 is grasped to move the bar 18 to forward position, cam 23 of projection 21 is pushed under raised portion 2a of striker 2, causing the other end of the bar to raise on pin 3 so it will be at the lower extremity of the slot 19 and arm 20 will be in position to slide over flange 13. The bar and striker are then raised pivotally up and over fulcrum pin 3 to the rear end of the base 1, and slot 27 of the bar is engaged with projection 32 of staple 31, so bridge 28 will be under this projection as shown in Fig. 2, Fig. 4 and Fig. 10.

In raising the handle, the friction of arm 20 on flange 13 will cause the forward end of the bait lever 16 to raise and cause the lower rear edge 15 of upstanding flange 11 to move down until it strikes against spring coil base support 6, as shown in Fig. 2. The treadle 9 will remain in this position during the whole movement of the handle with the striker and will stay in this position after the trap is set.

The sliding member 13 is so proportioned that when the trap is set the forward edge of the arm 20 will slide a little beyond the lower edge of the track 13, as shown in Fig. 10, to such a position that a small downward movement of bait lever 16 will move the lower edge of the track 13 beyond the rear edge of the arm 20, releasing it. The force of the springs 5 exerted on the striker 2 then causes an upward push on cam 23 which tends to raise the other end of the lifting bar previously held down by arm 20 against flange 13. Thus when arm 20 is released, cam 23 is pushed outward, releasing the striker which returns to its normal position.

Fig. 12 shows a modified base, made preferably of sheet metal. Fig. 13 shows a modified jaw or striker, also preferably made of sheet metal. These parts will perform the same operations as the parts previously described. They are given the same numerals with the addition of 100 to avoid confusion.

The base 101 has preferably an upstanding peripheral flange 101a with notch 101b. Upstanding ears 104 are formed at each side of the base and if necessary in the center as shown with dotted lines, with apertures 104a to receive pin 3. Instead of slot 27 lifting bar 18 may have a recess 127 as shown in Fig. 14.

With the trap in set position, the bar 18 will be held by projection 132 formed at the rear end of the base as shown in Fig. 12 and Fig. 14. A rib 101c may be formed on each side of the base to reinforce the metal at these points.

The modified form of jaw 102 is preferably formed of sheet metal and has a notch 102a for receiving cam 24. The outer edge of this notch is rounded so it may slide freely on the cam. The jaw 102 is also provided with slots 102b for receiving the spring coil extensions 7.

What I claim is:

1. An animal trap comprising a base, a spring actuated striking member having a raised portion, a bait carrying treadle and a lifting bar, said striking member, treadle, and lifting bar being pivoted at one end on the base for concentric movement, said bar having a handle at its free end and an aperture near one edge thereof, the other edge of the free end of said bar having a downwardly protruding extension provided with a tongue whose edge forms a cam for engaging said raised portion on said striking member, said base having a member for engaging the aperture in said bar for setting said trap.

2. An animal trap comprising a base, a spring actuated striking member having a raised portion, a bait carrying treadle, and a lifting bar, a fulcrum pin on said base; said striking member, treadle and bar being pivoted at one end on said fulcrum pin; said bar having a handle at its free end and an aperture near one edge thereof, the other edge of the free end of said bar having a downwardly protruding extension with a tongue whose edge forms a cam for engaging said raised portion on said striking member, the rear end of said bar having a forwardly slanted aperture movable up and down on said fulcrum pin.

3. An animal trap comprising a base, a spring actuated jaw having a raised portion, a bait carrying treadle, and a lifting bar, a fulcrum pin on said base; said jaw, treadle and bar being pivoted at one end on said fulcrum pin; said bar having a handle at its free end and an aperture near one edge thereof, the other edge of the free end of said bar having a downwardly protruding extension with a tongue whose edge forms a cam for engaging the raised portion of said jaw, the rear end of said bar having a forwardly slanted aperture movable up and down on said fulcrum pin, and a horizontal arm protruding from said bar adjacent said aperture.

4. An animal trap comprising a base, a spring actuated jaw, a spring for actuating said jaw, a treadle, a lifting bar; a pin on said base pivotally supporting one end each of said jaw, said treadle and said bar; said treadle having a pair of upstanding flanges with pin apertures receiving said pin, a spacer pivoted on said pin between one of said upstanding flanges and said lifting bar, said bar having a projection provided with a tongue whose edge provides a cam for engaging the jaw at the free end thereof, an aperture in said bar adjacent said tongue, said base having a member for engaging said lifting bar through said aperture therein when setting said trap, and means for latching said jaw in set position.

5. An animal trap comprising a base, a spring actuated jaw having a raised portion, a bait carrying treadle, and a lifting bar, a fulcrum pin on said base; said jaw, treadle and bar being pivoted at one end on said fulcrum pin; said bar having a handle at its free end and an aperture near one edge thereof, the other edge of the free end of said bar having a downwardly protruding extension with a tongue whose edge forms a cam for engaging the raised portion of said jaw, the rear end of said bar having a forwardly slanted aperture movable up and down on said fulcrum pin, said treadle having a pair of upstanding flanges provided with pin apertures receiving said fulcrum pin, one of said flanges having an inwardly bent arcuate portion extending partially around the pin aperture thereof and the other of said flanges having a rearward extension acting as a stop against said base, and a horizontal arm protruding from said bar adjacent said slanted aperture, said arcuate portion being adapted to engage said arm to hold said tongue in engagement with the raised portion of said jaw to maintain the trap in set position.

6. An animal trap comprising a base, a spring actuated jaw having a raised portion, a bait carrying treadle, and a lifting bar, a fulcrum pin on said base; said jaw, treadle and bar being pivoted at one end on said fulcrum pin; said bar having a handle at its free end and an aperture near one edge thereof, the other edge of the free end of said bar having a downwardly protruding extension with a tongue whose edge forms a cam for engaging the raised portion of said jaw, the rear end of said bar having a forwardly slanted aperture movable up and down on said fulcrum pin, said treadle having a pair of upstanding flanges provided with pin apertures receiving said fulcrum pin, one of said flanges having an inwardly bent arcuate portion extending partially around the pin aperture thereof, and a horizontal arm protruding from said bar adjacent said slanted aperture, said arcuate portion being adapted to engage said arm to hold said tongue in engagement with the raised portion of said jaw to maintain the trap in set position.

WILLIAM E. PETERSEN.

REFERENCES CITED

The following references are of record in the file of this patent:

UNITED STATES PATENTS

| Number | Name | Date |
| --- | --- | --- |
| 1,919,527 | Orr | July 25, 1933 |
| 2,263,560 | Barrows | Nov. 25, 1941 |